United States Patent
Wu et al.

(10) Patent No.: US 8,113,799 B2
(45) Date of Patent: Feb. 14, 2012

(54) OIL-FREE CENTRIFUGAL BLADE COMPRESSOR AND MAGNETIC-GAS BEARING THEREOF

(75) Inventors: Teng-Yuan Wu, Changhua County (TW); Cheng-Chung Yen, Hsinchu (TW); Chung-Ping Chiang, Taipei (TW); Jiing-Fu Chen, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 412 days.

(21) Appl. No.: 12/425,565

(22) Filed: Apr. 17, 2009

(65) Prior Publication Data

US 2010/0158718 A1    Jun. 24, 2010

(30) Foreign Application Priority Data

Dec. 24, 2008    (TW) ................ 97150387 A

(51) Int. Cl.
*F04B 35/04*    (2006.01)

(52) U.S. Cl. ................... 417/410.1; 310/90.5

(58) Field of Classification Search ............... 417/410.1, 417/417, 488, 418; 415/90, 116, 169.1, 168.1; 310/90.5, 258, 179; 57/414, 406
See application file for complete search history.

(56) References Cited

FOREIGN PATENT DOCUMENTS

CN    1730959 A    2/2006

*Primary Examiner* — Joseph L Williams
(74) *Attorney, Agent, or Firm* — Morris Manning & Martin LLP; Tim Tingkang Xia, Esq.

(57) ABSTRACT

A magnetic-gas bearing disposed in a compressor is provided. The magnetic-gas bearing includes an axis, multiple magnetic elements, multiple magnetic coils and a static pressure gas restrictor. The magnetic elements encircle the axis, and each magnetic element has two ends wound around by the magnetic coils respectively, such that the two ends of each magnetic element form a first magnetic pole and a second magnetic pole respectively. The static pressure gas restrictor encircles the axis and has a jet opening, such that the gas pass through the jet opening to form a gas-film between the static pressure gas restrictor and the axis. Besides, an oil-free centrifugal blade compressor including the magnetic-gas bearing mentioned above is also provided.

16 Claims, 9 Drawing Sheets

OIL-FREE CENTRIFUGAL BLADE COMPRESSOR AND MAGNETIC-GAS BEARING THEREOF

FIELD OF THE INVENTION

The present invention relates to a compressor and its bearing, and more particularly, to an oil-free centrifugal blade compressor and the magnetic-gas bearing thereof.

BACKGROUND OF THE INVENTION

Currently, there are three kinds of contact-type bearings that are most commonly being adopted by conventional compressors, which are the ball bearing, the roller bearing and the sliding bearing. However, as such mechanically sealed contact-type bearings can not operate without suffering contact abrasion and they should required to be cooled down by flowing oils during operation, problems such as shaft power wastage and oil vapor pollution are inevitable that are usually the reasons causing those conventional compressors with the aforesaid contact-type bearings to operate at low efficiency.

For avoiding the aforesaid problems, there are magnetic bearings and gas bearings that are already available for the compressors. However, those two types of bearings are still has shortcomings. For the magnetic bearings, they are not popular since they can be very costly to manufacture, not to mention that their ability to support a load are restricted by the magnetic saturation of the bearing's material. For the gas bearings, the compressibility of the gases used in such gas bearing will cause the gas bearings to become unstable.

Moreover, there is a prior-art magnetic-gas bearing being provided in CN 200510041540.5, which can prevent the baring to contact directly with its corresponding shaft by the use of a pneumatic device. However, the load performance of such prior-art magnetic-gas bearing is still not satisfactory and is hard to improve. In addition, as the magnetic poles in such prior-art magnetic-gas bearing are radially arranged while having its complaint foils to be fitted in the gaps formed between the magnetic poles and its corresponding shaft, the penetration of the magnetic lines of those magnetic poles are adversely affected and thus lower the magnetic levitation of the bearing.

SUMMARY OF THE INVENTION

The object of the present invention is to provide a high-speed, high-precision magnetic-gas bearing that is not only capable of causing no contamination and no friction loss during operation, but also is capable of overcoming the low load performance of the magnetic bearings and the instability of the gas bearings, and moreover, it can be adapted for oil-free centrifugal refrigerant compressor without causing high shaft power wastage.

The present invention provides a magnetic-gas bearing, comprising: an axis, a plurality of magnetic elements, a plurality of magnetic coils and a static pressure gas restrictor. The magnetic elements encircle the axis, and each magnetic element has two ends wound around by the magnetic coils respectively, such that the two ends of each magnetic element form a first magnetic pole and a second magnetic pole respectively. The static pressure gas restrictor encircles the axis and has a jet opening, such that the gas pass through the jet opening to form a gas-film between the static pressure gas restrictor and the axis.

The present further provides an oil-free centrifugal blade compressor, comprising a motor assembly, a gear box assembly and a blade assembly, in which the gear box assembly is used for connecting the motor assembly and the blade assembly. In an embodiment of the invention, the motor assembly further comprises: a motor shaft, an induction motor coil and a first magnetic-gas bearing; the gar box assembly further comprises: a second magnetic-gas bearing, a third magnetic-gas bearing and a speed-increasing gear; and the blade assembly further comprises: a blade shaft, a fourth magnetic-gas bearing, a first-stage impeller, a second-stage impeller and an inlet guide vane. It is noted that the aforesaid first, second, third and fourth magnetic-gas bearings are the aforesaid magnetic-gas bearings.

The induction motor coil is arranged encircling the motor shaft, whereas the two end of the motor shaft are connected respectively to the axes of the first and the second magnetic-gas bearings. The speed-increasing gear is arranged connecting the second magnetic-gas bearing to the third magnetic-gas bearing, whereas the axes of the third and the fourth magnetic-gas bearings are connected respectively to the two ends of the blade shaft. Moreover, the second-stage impeller is connected to the axis of the fourth magnetic-gas bearing, whereas the first-stage impeller is further connected to the second-stage impeller; and the inlet guide vane used for guiding a fluid flowing therein through an inlet to a position between the first-stage impeller and the second-stage impeller for compression.

To sum up, the magnetic-gas bearing of the invention is operating primarily as a gas bearing which is assisted by a magnetic bearing, so that it can overcome the low load performance of the magnetic bearing and the instability of the gas bearing as well. In addition, the magnetic-gas bearing of the invention uses a static pressure gas restrictor for gas-film control and thereby adjusting its load capacity, so that the chance of causing any instability to the magnetic-gas bearing is greatly reduced. Moreover, as the plural magnetic poles in the magnetic-gas bearing are axially arranged in corresponding to its axis, so that the intensity of magnetic field formed between the plural magnetic poles will stay in a specific range without decaying.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1A:
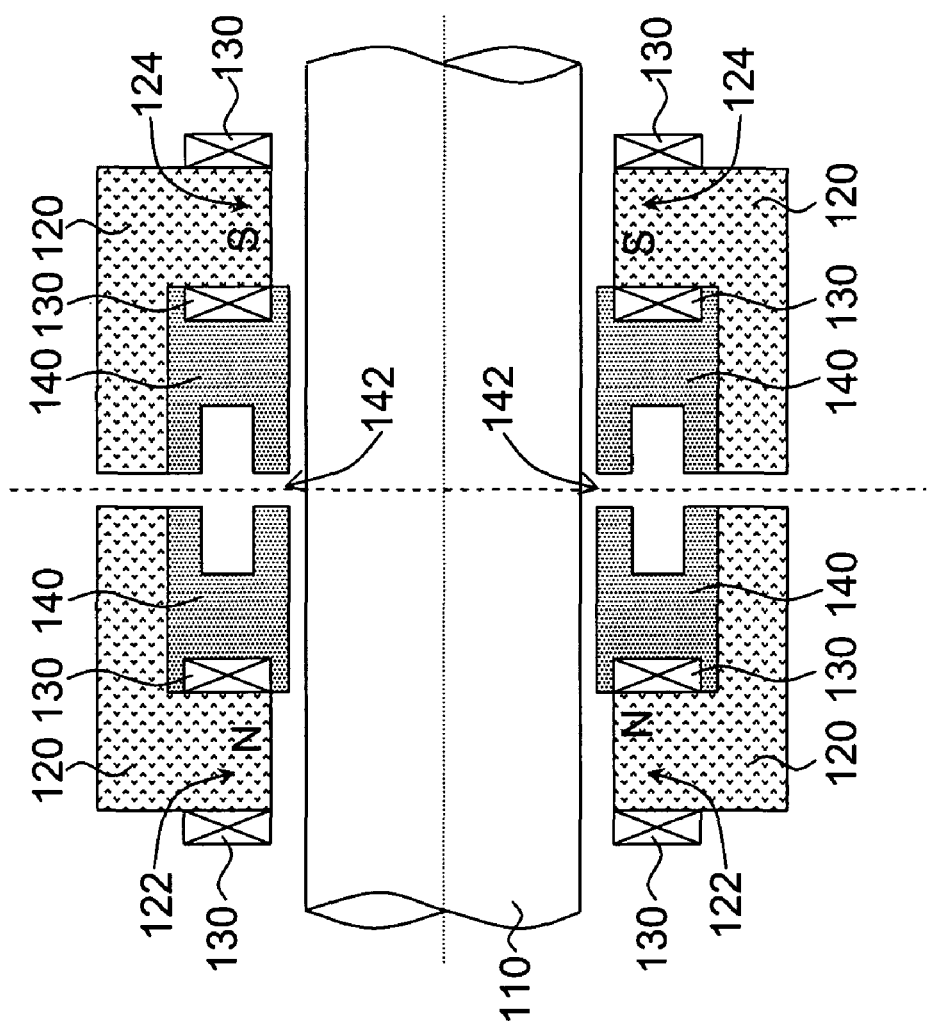
FIG. 1A is a sectional view of a magnetic-gas bearing according to an embodiment of the invention.
Figure 1B:
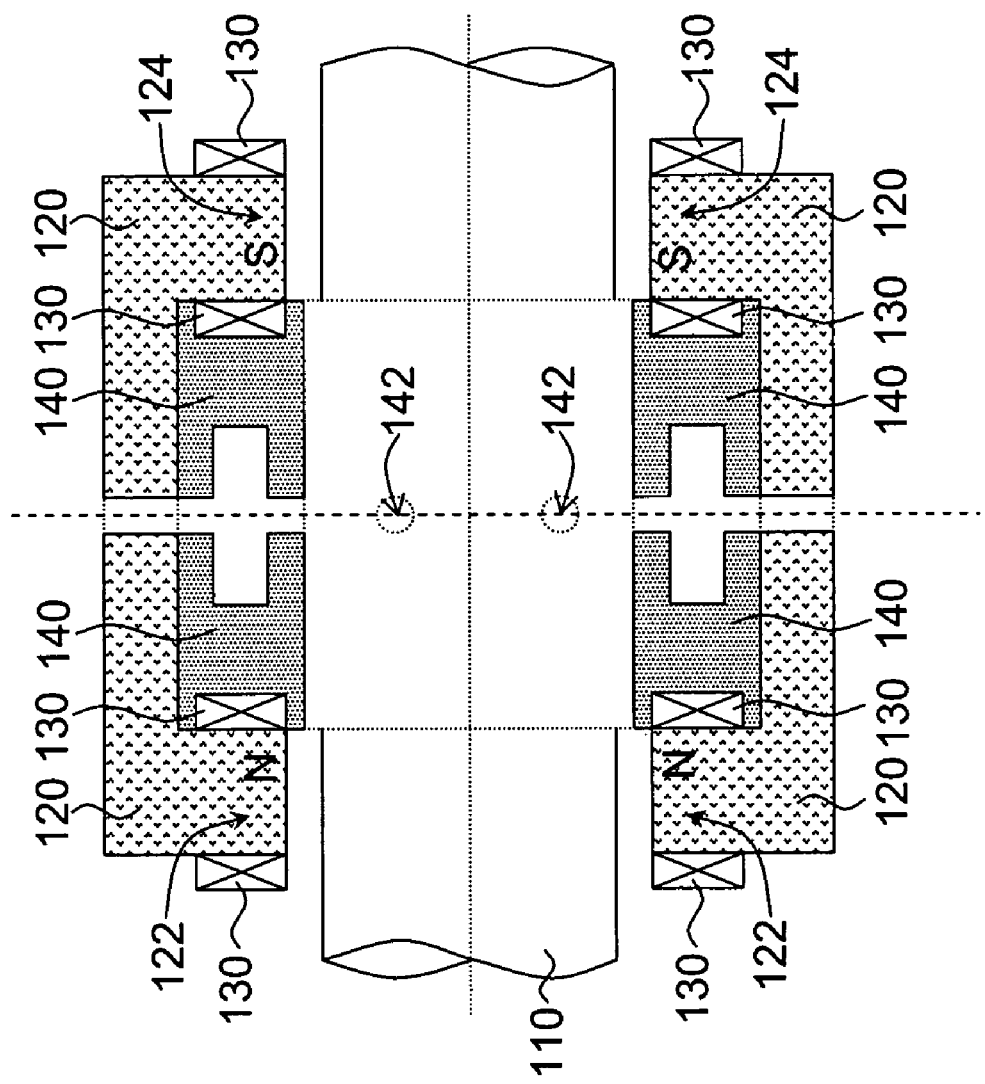
FIG. 1B is a perspective diagram showing a portion of the magnetic-gas bearing of FIG. 1A.

FIG. 1A is a sectional view of a magnetic-gas bearing according to an embodiment of the invention, and FIG. 1B is a perspective diagram showing a portion of the magnetic-gas bearing of FIG. 1A. As shown in FIG. 1A and FIG. 1B, the magnet-gas bearing 100 is adapted for a compressor, specifically for a centrifugal refrigerant compressor with low shaft power loss. The magnet-gas bearing 100 comprises: an axis 110, a plurality of magnetic elements 120, a plurality of magnetic coils 130 and a static pressure gas restrictor 140, in which the magnetic elements 120 and the magnetic coils 130 are used for controlling the axis 110 in a magnetic manner while the static pressure gas restrictor is used for controlling the axis 110 in a pneumatic manner.

In detail, each of the plural magnetic elements 120 is arranged encircling the axis 110 and is configured with two ends 122, 124 that are arranged facing toward the axis 110. Moreover, the plural magnetic coils 130 are respectively wound on the corresponding ends 122, 124 of each magnetic element 120 for enabling a first magnetic pole and a second magnetic pole to be formed respectively on the two ends 122, 124 of each magnetic element 120. It is noted that, in an embodiment, the first magnetic pole is a magnetic north pole while the second magnetic pole is a magnetic south pole.

Accordingly, by modulating the current flowing through the magnetic coils 130, the magnetic line density can be adjusted and used for controlling the axis 110 in a magnetic manner. Comparing with those magnetic coil used in conventional bearings that are disposed encircling the axis, the magnetic coils 130 are disposed wound on the two ends 122, 124 of their corresponding magnetic element 120, by that not only the manufacturing cost of the magnetic-gas bearing can be greatly reduced, but also the structures of both the magnetic element 120 and the magnetic coil 130 can be comparatively less complex.

In addition, different from the magnetic poles formed in those conventional bearings that are radially arranged, the plural magnetic poles in the magnetic-gas bearing of the invention are axially arranged in corresponding to its axis. Thereby, there will be no substances existed in gaps sandwiched between the magnetic poles and the axis so that the intensity of magnetic field formed between the plural magnetic poles will stay in a specific range without decaying and thus the magnetic levitation of the bearing is enhanced.

In this embodiment, each magnetic element 120 is a magnetic silicon steel sheet, however, it is not limited thereby. Moreover, it is noted that the plural magnetic elements 120 are equiangularly spaced and disposed encircling the axis 110 in a symmetrical manner. Although there are only two magnetic elements 120 shown in the embodiment of FIG. 1A, the amount of the magnetic elements 120 is not limited thereby.

Thus, if there are four magnetic elements 120, the four magnetic elements 120 will be configured in the magnetic-gas bearing in a manner that they are equiangularly spaced by ninety degrees and thus disposed symmetrically encircling the axis 110; and if there are six magnetic elements 120, the six magnetic elements 120 will be configured in the magnetic-gas bearing in a manner that they are equiangularly spaced by sixty degrees and thus disposed symmetrically encircling the axis 110; and if there are eight magnetic elements 120, the eight magnetic elements 120 will be configured in the magnetic-gas bearing in a manner that they are equiangularly spaced by forty-five degrees and thus disposed symmetrically encircling the axis 110; and so on.

As shown in FIG. 1A and FIG. 1B, the static pressure gas restrictor 140 is structured like a ring encircling the axis 110, which is configured with a jet opening 142, provided for a gas to flow passing through, and thus causing a gas-film to be formed at a position between the static pressure gas restrictor 140 and the axis 110. Thereby, the axis 110 is supported by the gas-film for allowing the same to rotate.

In this embodiment, as the static pressure gas restrictor 140 is disposed at a position between the two ends of the magnetic elements 120, there are passages formed in those magnetic elements at positions corresponding to the jet opening 142 to be used for allowing gas to flow into the static pressure gas restrictor 140 form the external environment. Nevertheless, the disposition of the static pressure gas restrictor 140 is not limited by the aforesaid embodiment, that it can be disposed outside the two ends of the magnetic elements 120 for instance.

At the initiating rotation of the axis 110 or when the axis 110 is enabled to rotate at a low speed, the magnetic-gas bearing of the invention is operating primarily as a gas bearing which is assisted by a magnetic bearing. On the other hand, when the axis 110 is enabled to rotate at a high speed, it is supported by a static gas pressure and a pneumatic gas pressure generated from the gas bearing structure of the magnetic-gas bearing while the magnetic levitation form its magnetic bearing structure is used for improving the stability of the gas bearing support and also is helpful for improving run-out precision of the axis 110. Accordingly, the simple-structured magnetic-gas bearing 100 of the invention is able to operate with the benefit of both the conventional gas bearing and magnetic bearing, but also it has better structure rigidity and dynamic characteristics comparing with those prior-art bearings.

In the embodiment shown in FIG. 1A and FIG. 1B, by forming the gap between the static pressure gas restrictor 140 and the axis 110 slightly smaller than that between the magnetic poles and the axis 110, the magnetic poles and the axis 110 are protected from friction wear by contact. In detail, as the axis 110 is formed with a uniform radius, the aforesaid gaps can only be adjusted by adjusting the positions of the static pressure gas restrictor 140 and the magnetic elements 120. However, it is possible to have an axis 110 that is sectioned as each section of the axis 110 is formed with different radii so as to be used for achieving the aforesaid gap adjustment, as shown in other embodiments of the invention.

By forming different jet opening 142 in the magnetic-gas bearing, the magnetic-gas bearing can be achieved different pneumatic supports. In this embodiment, the jet opening 142 is designed as a divided opening composed of a plurality of round holes. The other kinds of jet openings are illustrated in the magnetic-gas bearings 100 disclosed in other embodiments of the invention. For simplicity, it is preferred to marked the components that are same to those used in the embodiment shown in FIG. 1A in functionalities and in names with same numbering.

Figure 2A:
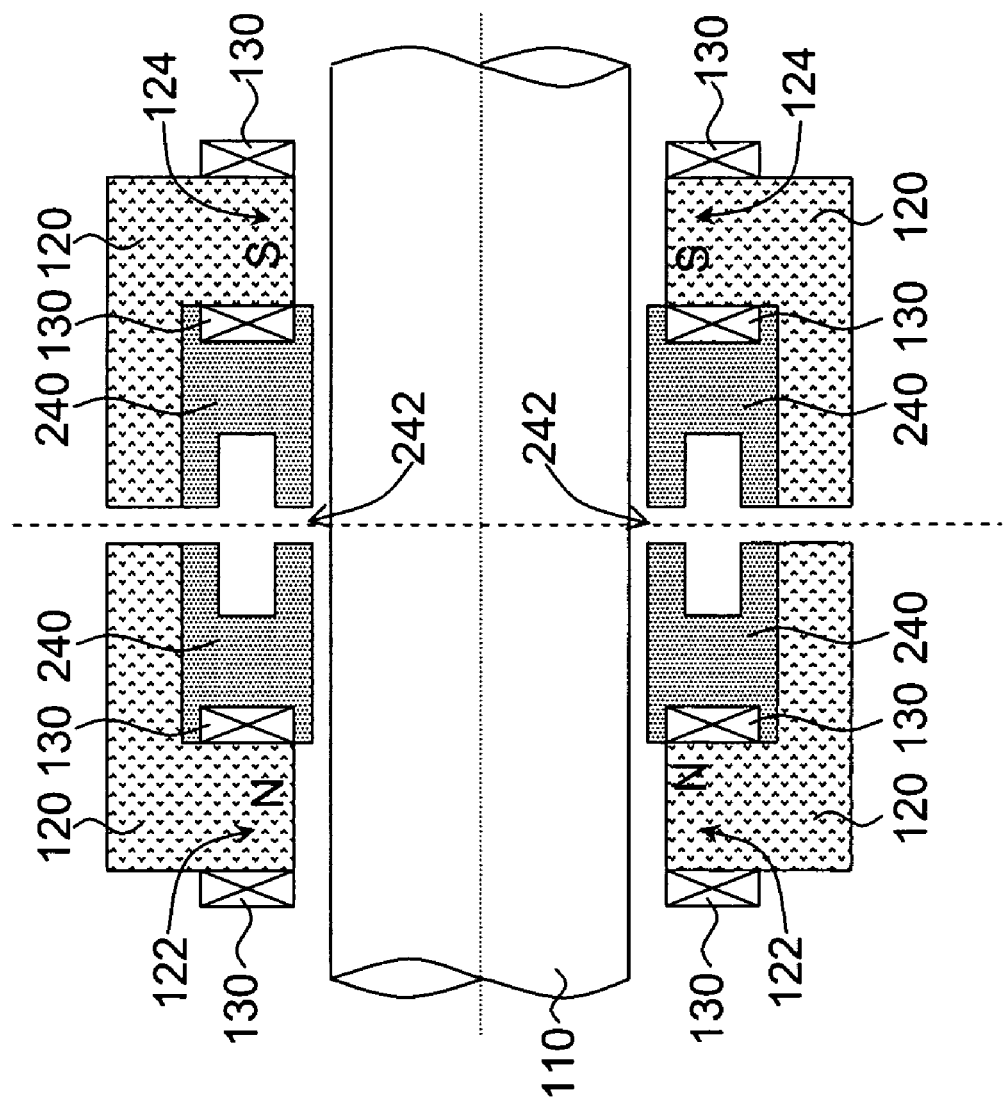
FIG. 2A is a sectional view of a magnetic-gas bearing according to another embodiment of the invention.
Figure 2B:
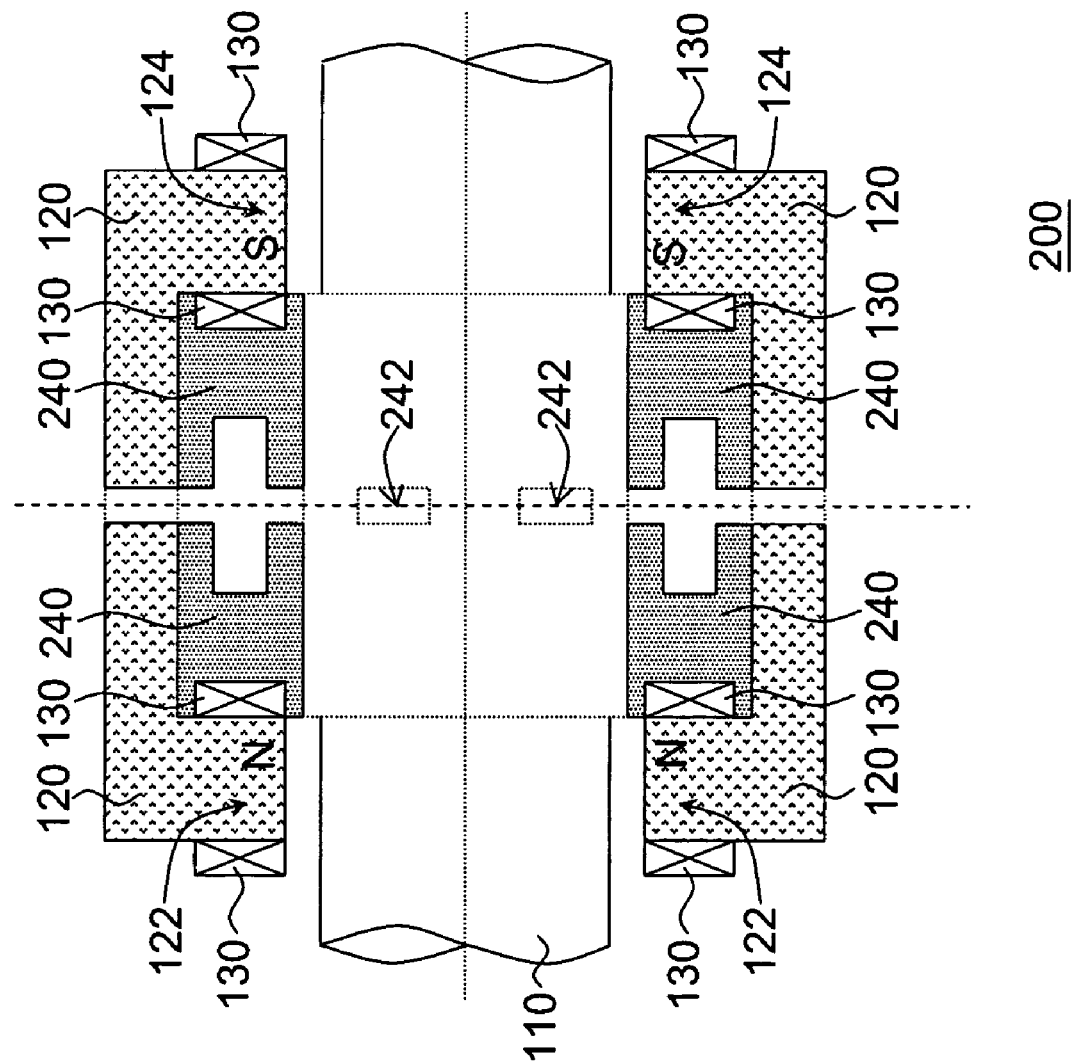
FIG. 2B is a perspective diagram showing a portion of the magnetic-gas bearing of FIG. 2B.

Please refer to FIG. 2A and FIG. 2B, which are respectively a sectional view of a magnetic-gas bearing according to another embodiment of the invention; and a perspective diagram showing a portion of the magnetic-gas bearing of FIG. 2B. As shown in FIG. 2A and FIG. 2B, the magnet-gas bearing 200 in this embodiment is structured similar to the previous magnet-gas bearing 100, but is different in that: although the jet opening 242 in the static pressure gas restrictor 240 of this embodiment is also structured as divided opening, but instead of round holes, it is composed of a plurality of square holes.

Figure 3A:
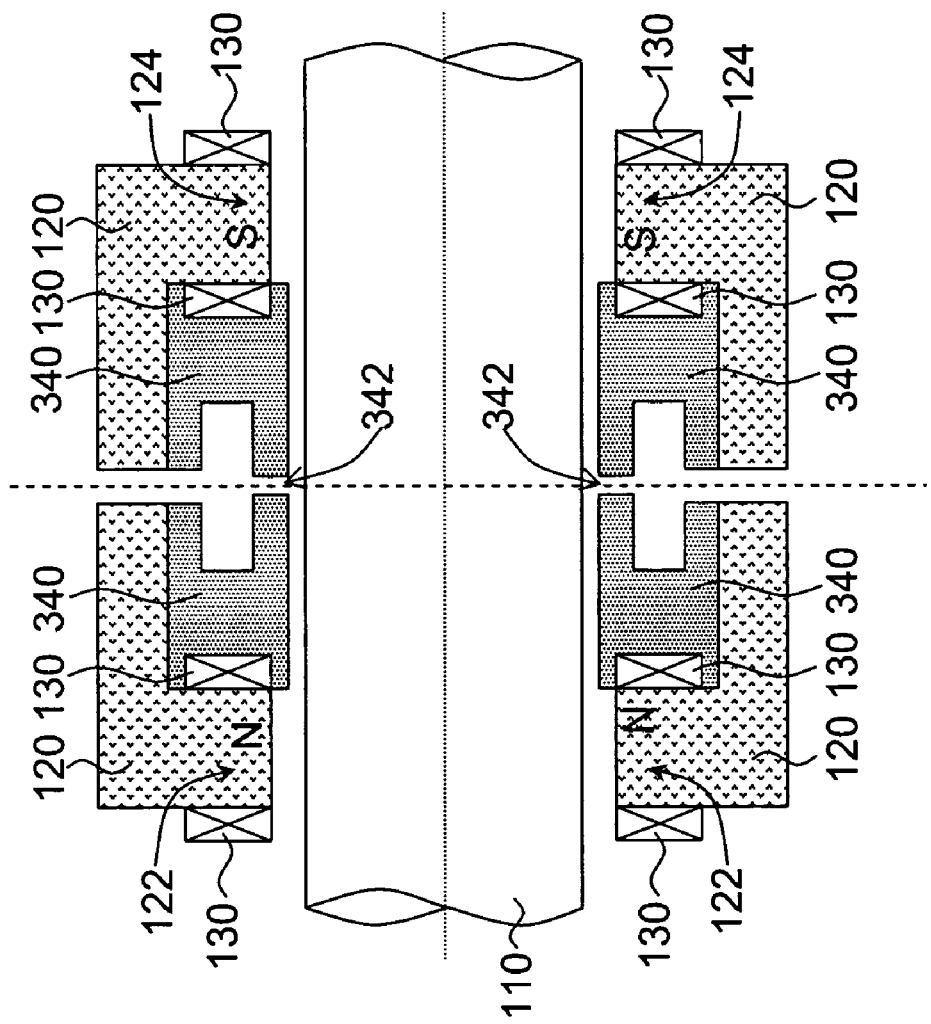
FIG. 3A is a sectional view of a magnetic-gas bearing according to yet another embodiment of the invention.
Figure 3B:
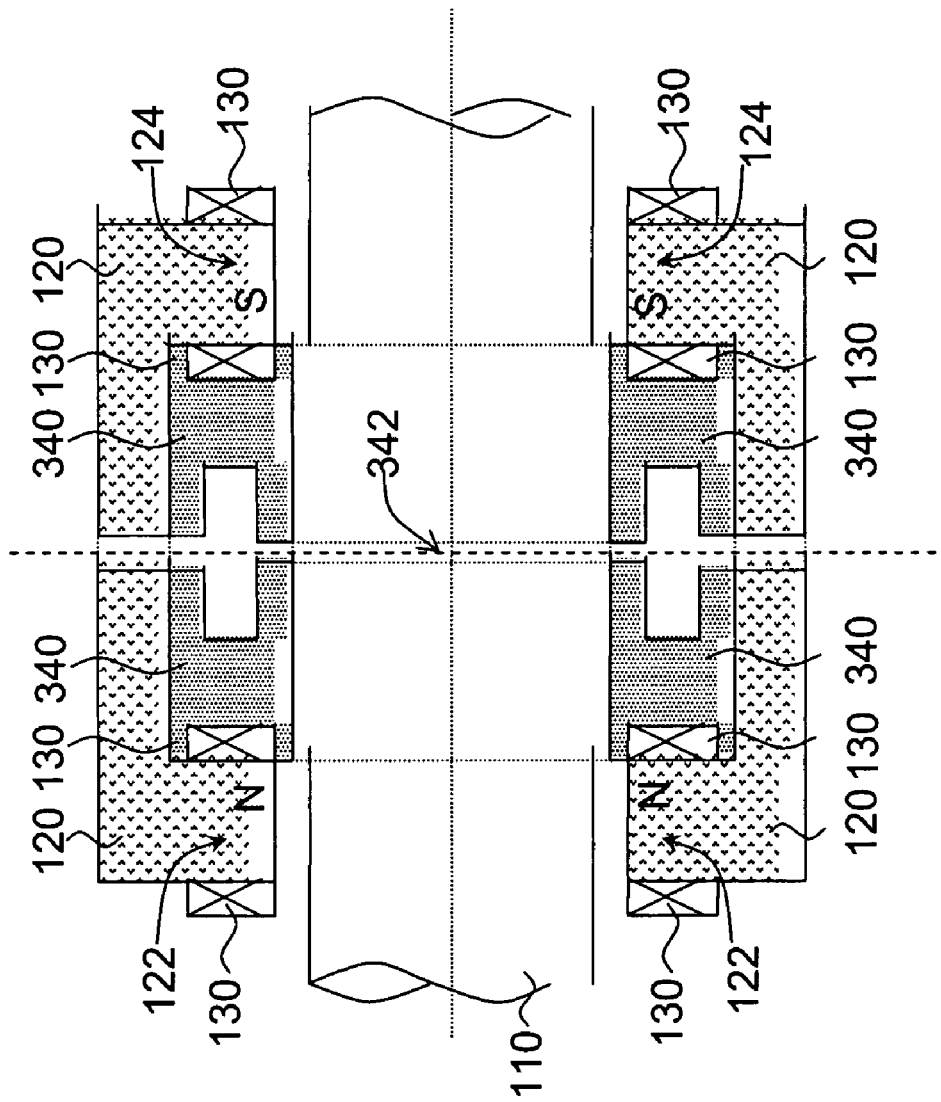
FIG. 3B is a perspective diagram showing a portion of the magnetic-gas bearing of FIG. 3B.

Please refer to FIG. 3A and FIG. 3B, which are respectively a sectional view of a magnetic-gas bearing according to another embodiment of the invention; and a perspective diagram showing a portion of the magnetic-gas bearing of FIG. 3B. As shown in FIG. 3A and FIG. 3B, the magnet-gas bearing 300 in this embodiment is structured similar to the previous magnet-gas bearing 100, but is different in that: the jet opening 342 in the static pressure gas restrictor 340 of this embodiment is also structured as a continuing circular hole.

Figure 4:
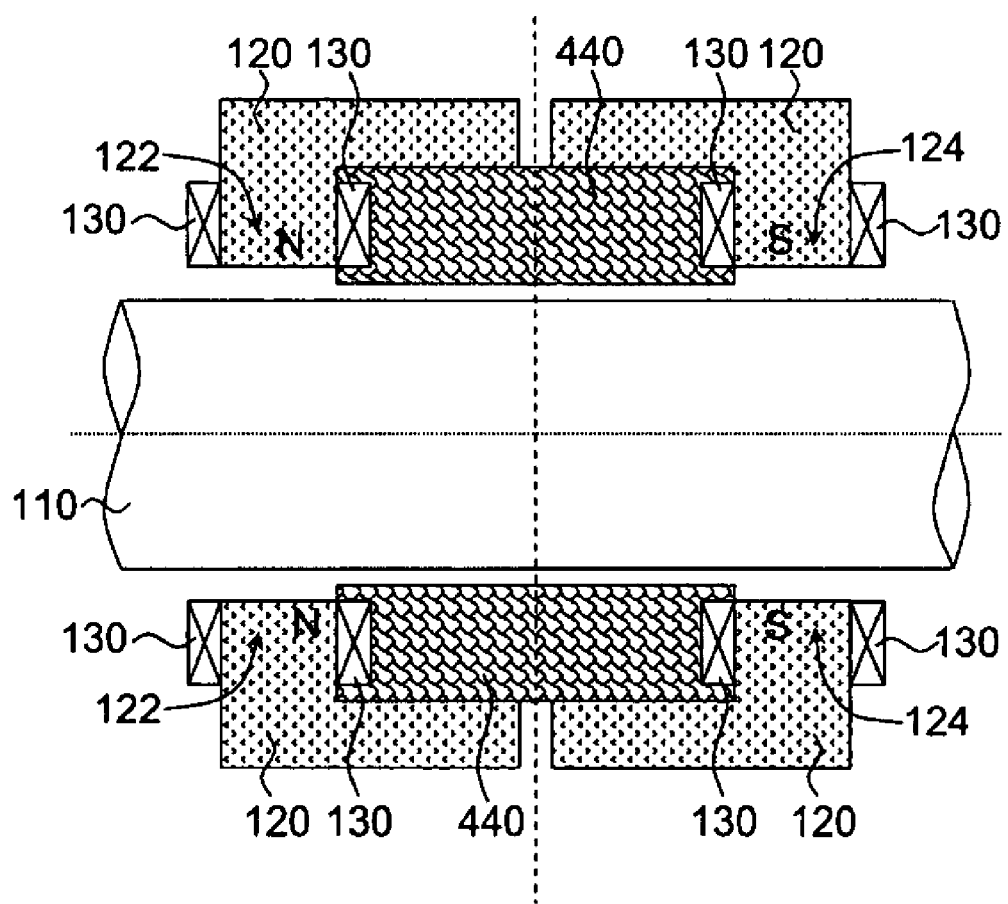
FIG. 4 is a sectional view of a magnetic-gas bearing according to further another embodiment of the invention.

It is emphasized that the design of the jet opening in the present invention is not limited by the aforesaid embodiments. In addition, the material of the static pressure gas restrictor can be various without limitations. Please refer to FIG. 4, which is a sectional view of a magnetic-gas bearing according to further another embodiment of the invention. In FIG. 4, the magnet-gas bearing 400 in this embodiment is structured similar to the previous magnet-gas bearing 100, but is different in that: the static pressure gas restrictor 440 of this embodiment is made of a porous material for allowing a gas to flow passing therethrough, and thus causing a gas-film to be formed at a position between the static pressure gas restrictor 440 and the axis 110.

Figure 5:
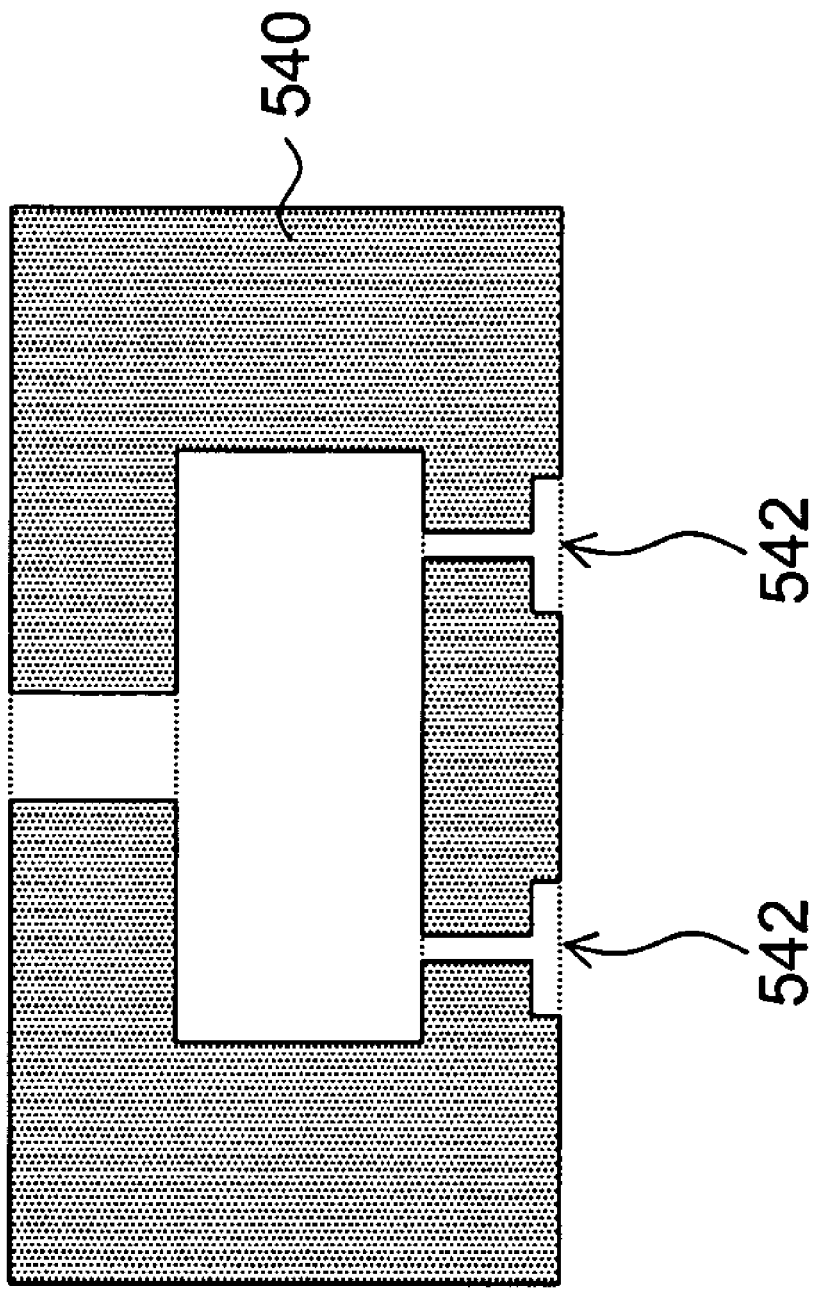
FIG. 5 is a sectional view of a static pressure gas restrictor according to an embodiment of the invention.

It is noted that there can be a variety of static pressure gas restrictors capable of being adapted for the present invention. Please refer to FIG. 5, which is a sectional view of a static pressure gas restrictor according to an embodiment of the invention. In FIG. 5, the static pressure gas restrictor 540 is structured similar to the previous static pressure gas restrictor 140, but is different in that: there are two jet openings 542 in the static pressure gas restrictor 540, that is, the static pressure gas restrictor is a restrictor with double exhausting bags design.

By the designs of the static pressure gas restrictor such as the divided opening, the continuing opening, the use of the porous material, the dynamic performance of the magnetic-gas bearing relating to the supporting ability and the stability can be improved, and the same time that the cooperation between the static pressure for supporting and the magnetic levitation can be matched almost seamlessly, by that the axial length of the bearing can be shortened effectively and the overall dynamic performance of the bearing can be improved as well.

It is noted that the aforesaid magnet-gas bearing can be adapted for common compressors, especially for the oil-free centrifugal blade compressor. The use of the magnet-gas bearing of the invention in an oil-free centrifugal blade compressor will be described further hereinafter.

Figure 6:
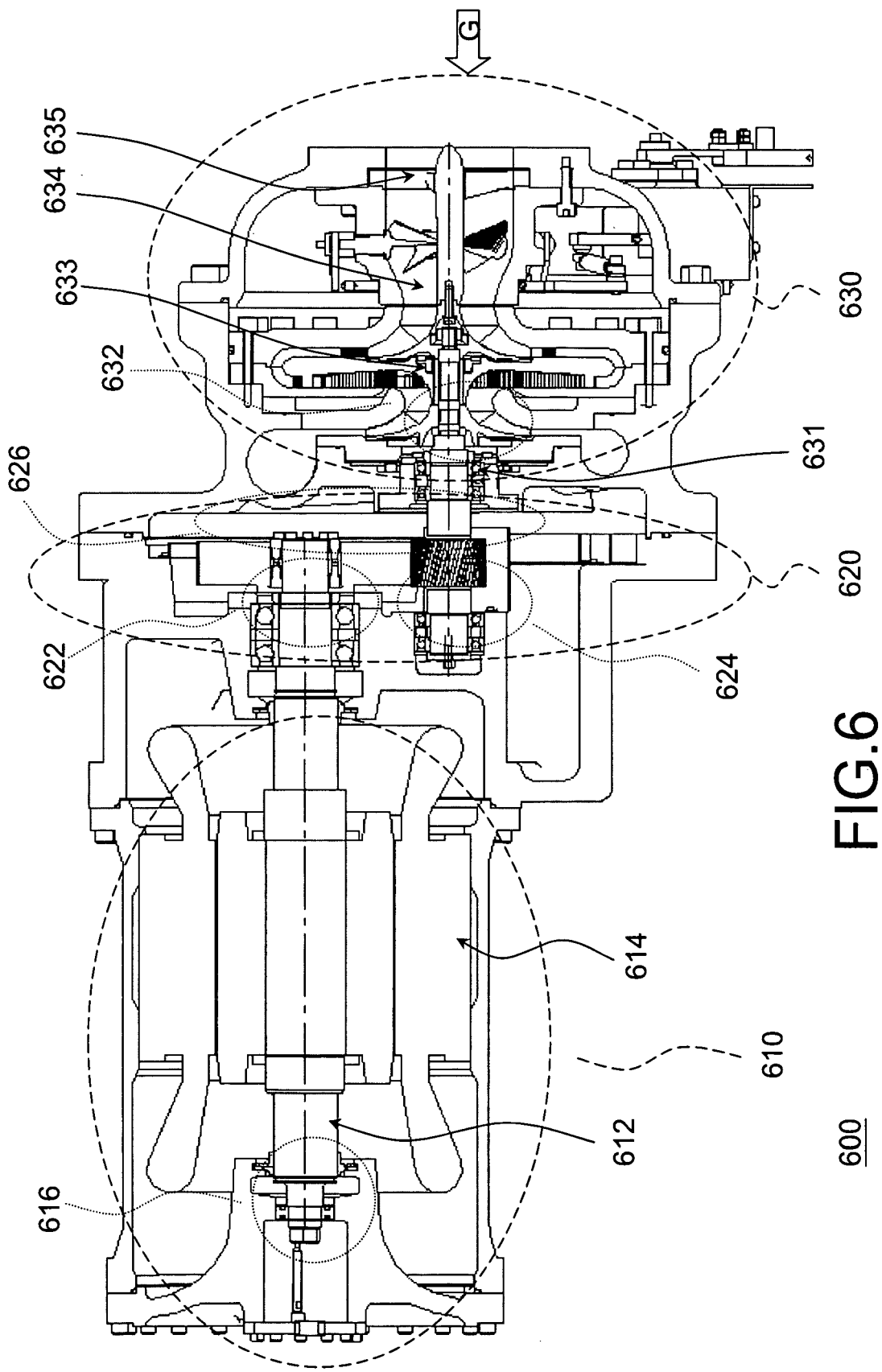
FIG. 6 is a section view of an oil-free centrifugal blade compressor according to an embodiment of the invention.

Please refer to FIG. 6, which is a section view of an oil-free centrifugal blade compressor according to an embodiment of the invention. In FIG. 6, the oil-free centrifugal blade 600 compressor comprises: a motor assembly 610, a gear box assembly 620 and a blade assembly 60, in which the gear box assembly 620 is used for connecting the motor assembly 610 to the blade assembly 630 so as to transfer the power from the motor assembly 610 to the blade assembly 630 for enabling the blade assembly 630 to compress a fluid flowing therein through an inlet G.

In detail, the motor assembly 610 further comprises: a motor shaft 612, an induction motor coil 614, and a first magnetic-gas bearing 616; the gear box assembly 620 comprises a second first magnetic-gas bearing 622, a third first magnetic-gas bearing 624 and a speed-increasing gear 626; and the blade assembly comprises: a blade shaft 631, a fourth magnetic-gas bearing 632, second-stage impeller 633, a first-stage impeller 634, and an inlet guide vane 635. It is noted that the referring first, second, third and the fourth magnetic-gas bearings are all the magnetic-gas bearing disclosed in the invention.

The induction motor coil 614 is disposed encircling the motor shaft 612 so the motor shaft can be driven to rotate according to the principle of electromagnetic conversion. The axes of the first and the second magnetic-gas bearings 616, 622 are connected respectively to the two ends of the motor shaft 612.

The speed-increasing gear 626 is disposed for connecting the axis of the second magnetic-gas bearing 622 to the axis of the third magnetic-gas bearing 624 in a manner that the rotation ratio between the axis rotation speed of the second magnetic-gas bearing 622 and that of the third magnetic-gas bearing 624 can be adjusted thereby. As the axes of the third and the fourth magnetic-gas bearings 624, 632 are connected respectively to the two ends of the blade shaft 631, power generated from the motor assembly 610 can be transferred to the blade assembly 630.

Moreover, the second-stage impeller 633 is connected to the fourth magnetic-gas bearing 632 while the first-stage impeller 634 is connected to the second-stage impeller 632; and the inlet guide vane 635 is used for guiding a fluid flowing therein through an inlet G to a position between the first-stage impeller 634 and the second-stage impeller 633 for compression. It is easily understood by those skilled in the art that since the aforesaid oil-free centrifugal blade compressor 600 adopts the magnet-gas bearings of the invention, it can operate better than those use conventional bearings, and thus will not be described further herein.

To sum up, the aforesaid oil-free centrifugal blade compressor adopts the magnet-gas bearings of the invention has the following advantages:

(1) As the gas-film supporting ability can be adjusting by the use of the static pressure gas restrictor, the instability problem suffering the conventional gas bearing is solved, so that at the initiating rotation of the bearing axis or when the bearing axis is enabled to rotate at a low speed, the magnetic-gas bearing of the invention is operating primarily as a gas bearing which is assisted by a magnetic bearing; and on the other hand, when the bearing axis is enabled to rotate at a high speed, it is supported by a static gas pressure and a pneumatic gas pressure generated from the gas bearing structure of the magnetic-gas bearing while the magnetic levitation form its magnetic bearing structure is used for improving the stability of the gas bearing support and also is helpful for improving run-out precision of the axis.

(2) As the plural magnetic poles in the magnetic-gas bearing are axially arranged in corresponding to its axis, so that the intensity of magnetic field formed between the plural magnetic poles will stay in a specific range without decaying.

(3) By the designs of the static pressure gas restrictor for achieving various gas support abilities, such as the divided opening, the continuing opening, the use of the porous material, the dynamic performance of the magnetic-gas bearing relating to the supporting ability and the stability can be improved.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A magnetic-gas bearing disposed in a compressor, comprising:
    an axis;
    a plurality of magnetic elements, arranged encircling the axis, each being configured with two ends facing toward the axis;
    a plurality of magnetic coils, being wound on the two ends of each magnetic element for enabling a first magnetic pole and a second magnetic pole to be formed respectively on the two ends of each magnetic element; and
    a static pressure gas restrictor, arranged encircling the axis while being configured with a jet opening, provided for a gas to flow passing through, and thus causing a gas-film to be formed at a position between the static pressure gas restrictor and the axis.

2. The magnetic-gas bearing of claim 1, wherein each magnetic element is a magnetic silicon steel sheet.

3. The magnetic-gas bearing of claim 1, wherein the static pressure gas restrictor is disposed at a position between the two ends of the plural magnetic elements.

4. The magnetic-gas bearing of claim 1, wherein the static pressure gas restrictor is disposed at a position outside the two ends of the plural magnetic elements.

5. The magnetic-gas bearing of claim 1, wherein the jet opening is designed as a divided opening.

6. The magnetic-gas bearing of claim 5, wherein the jet opening with divided design is substantially formed as an assembly of a plurality of round holes.

7. The magnetic-gas bearing of claim 5, wherein the jet opening with divided design is substantially formed as an assembly of a plurality of square holes.

8. The magnetic-gas bearing of claim 1, wherein the jet opening is designed as a continuing opening.

9. The magnetic-gas bearing of claim 8, wherein the jet opening with continuing design is substantially formed as a circular hole.

10. The magnetic-gas bearing of claim 1, wherein the static pressure gas restrictor is made of a porous material.

11. The magnetic-gas bearing of claim 1, wherein the plural magnetic elements are disposed encircling the axis in a symmetrical manner.

12. The magnetic-gas bearing of claim 11, wherein there are four magnetic elements being configured in the magnetic-gas bearing in a manner that they are equiangularly spaced by ninety degrees and thus disposed symmetrically encircling the axis.

13. The magnetic-gas bearing of claim 11, wherein there are six magnetic elements being configured in the magnetic-gas bearing in a manner that they are equiangularly spaced by sixty degrees and thus disposed symmetrically encircling the axis.

14. The magnetic-gas bearing of claim 11, wherein there are eight magnetic elements being configured in the magnetic-gas bearing in a manner that they are equiangularly spaced by forty-five degrees and thus disposed symmetrically encircling the axis.

15. The magnetic-gas bearing of claim 1, wherein the first magnetic pole is a magnetic north pole while the second magnetic pole is a magnetic south pole.

16. An oil-free centrifugal blade compressor, comprising:
    a motor assembly, further comprising:
        a motor shaft,
        an induction motor coil, disposed encircling the motor shaft; and
        a first magnetic-gas bearing, further comprising:
            an axis, connecting to an end of the motor shaft;
            a plurality of magnetic elements, arranged encircling the axis, each being configured with two ends facing toward the axis;
            a plurality of magnetic coils, being wound on the two ends of each magnetic element for enabling a first magnetic pole and a second magnetic pole to be formed respectively on the two ends of each magnetic element; and
            a static pressure gas restrictor, arranged encircling the axis while being configured with a jet opening, provided for a gas to flow passing through, and thus causing a gas-film to be formed at a position between the static pressure gas restrictor and the axis;
    a gear box assembly, connected to the motor assembly, further comprising:
        a second magnetic-gas bearing, further comprising:
            an axis, connecting to another end of the motor shaft that is not connected to the axis of the first magnetic-gas bearing;
            a plurality of magnetic elements, arranged encircling the axis, each being configured with two ends facing toward the axis;
            a plurality of magnetic coils, being wound on the two ends of each magnetic element for enabling a first magnetic pole and a second magnetic pole to be formed respectively on the two ends of each magnetic element; and
            a static pressure gas restrictor, arranged encircling the axis while being configured with a jet opening, provided for a gas to flow passing through, and thus causing a gas-film to be formed at a position between the static pressure gas restrictor and the axis;
        a third magnetic-gas bearing, further comprising:
            an axis;
            a plurality of magnetic elements, arranged encircling the axis, each being configured with two ends facing toward the axis;
            a plurality of magnetic coils, being wound on the two ends of each magnetic element for enabling a first magnetic pole and a second magnetic pole to be formed respectively on the two ends of each magnetic element; and
            a static pressure gas restrictor, arranged encircling the axis while being configured with a jet opening, provided for a gas to flow passing through, and thus causing a gas-film to be formed at a position between the static pressure gas restrictor and the axis;
        a speed-increasing gear, disposed for connecting the axis of the second magnetic-gas bearing to the axis of the third magnetic-gas bearing; and
    a blade assembly, further comprising:
        a blade shaft, having an end connecting to the axis of the third magnetic-gas bearing;
        a fourth magnetic-gas bearing, further comprising:

an axis, connecting to another end of the motor shaft that is not connected to the axis of the first magnetic-gas bearing;

a plurality of magnetic elements, arranged encircling the axis, each being configured with two ends facing toward the axis;

a plurality of magnetic coils, being wound on the two ends of each magnetic element for enabling a first magnetic pole and a second magnetic pole to be formed respectively on the two ends of each magnetic element; and a static pressure gas restrictor, arranged encircling the axis while being configured with a jet opening, provided for a gas to flow passing through, and thus causing a gas-film to be formed at a position between the static pressure gas restrictor and the axis;

a second-stage impeller, connected to the axis of the fourth magnetic-gas bearing;

a first-stage impeller, connected to the second-stage impeller;

and an inlet guide vane, used for guiding a fluid flowing therein through an inlet to a position between the first-stage impeller and the second-stage impeller for compression.

\* \* \* \* \*